(12) United States Patent
Rafel et al.

(10) Patent No.: US 9,871,611 B2
(45) Date of Patent: Jan. 16, 2018

(54) METHOD OF INTRODUCING AN OUTSTATION INTO AN OPTICAL NETWORK AND OUTSTATION THEREFOR

(75) Inventors: Albert Rafel, Ipswich (GB); Derek Nesset, Little Kineton (GB); Mark E Scopes, Ipswich (GB); Alan M Hill, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 1789 days.

(21) Appl. No.: 12/295,117

(22) PCT Filed: Mar. 7, 2007

(86) PCT No.: PCT/GB2007/000788
§ 371 (c)(1),
(2), (4) Date: Sep. 29, 2008

(87) PCT Pub. No.: WO2007/113461
PCT Pub. Date: Oct. 11, 2007

(65) Prior Publication Data
US 2009/0263132 A1    Oct. 22, 2009

(30) Foreign Application Priority Data
Mar. 31, 2006  (EP) .................................... 06251853

(51) Int. Cl.
*H04J 3/16* (2006.01)
*H04J 3/06* (2006.01)
(Continued)

(52) U.S. Cl.
CPC .......... *H04J 3/1694* (2013.01); *H04J 3/0682* (2013.01); *H04L 41/0896* (2013.01); *H04L 29/12207* (2013.01); *H04L 61/20* (2013.01)

(58) Field of Classification Search
CPC ... H04J 3/1694; H04J 3/0682; H04L 41/0896; H04L 29/12207; H04L 61/20
(Continued)

(56) References Cited

U.S. PATENT DOCUMENTS 5,999,288 A    12/1999 Ellinas et al.
6,098,103 A *   8/2000 Dreyer et al. ................ 709/234
(Continued)

FOREIGN PATENT DOCUMENTS

JP    2006-059169    9/2007

OTHER PUBLICATIONS

International Search Report for PCT/GB2007/000788, dated Apr. 26, 2007.
(Continued)

*Primary Examiner* — Joshua King
(74) *Attorney, Agent, or Firm* — Amy M. Salmela; Patterson Thuente Pedersen, P.A.

(57) ABSTRACT

The present invention relates to the introduction of an outstation into an optical network. The optical network has a central station, and a plurality of previously introduced outstations which are optically connected to the central station. The network is operable in: a normal operating state in which data traffic is received from previously introduced outstations at a normal data rate; and, a set-up state in which the transmission of data traffic from the previously introduced outstations is restricted relative to the normal state, the method including the step of: when the network is in the set-up state, performing a set-up operation for introducing the outstation into the optical network, the set-up operation involving the transmission of set-up data from the outstation being introduced, wherein the set-up data is transmitted at a reduced rate relative to the normal operating rate.

13 Claims, 6 Drawing Sheets

(51) Int. Cl.
*H04L 12/24* (2006.01)
*H04L 29/12* (2006.01)

(58) Field of Classification Search
USPC .......................................................... 398/66
See application file for complete search history.

(56) References Cited

U.S. PATENT DOCUMENTS

| | | |
|---|---|---|
| 6,295,280 B1 | 9/2001 | Oh |
| 6,832,046 B1* | 12/2004 | Thomas .......................... 398/72 |
| 2001/0024423 A1 | 9/2001 | Duckwall et al. |
| 2002/0171895 A1* | 11/2002 | Chang ............................ 359/168 |
| 2003/0177215 A1* | 9/2003 | Sutherland et al. ........... 709/223 |
| 2003/0177216 A1* | 9/2003 | Sutherland et al. ........... 709/223 |
| 2005/0047782 A1 | 3/2005 | Davis et al. |
| 2006/0127087 A1* | 6/2006 | Kasai et al. .................... 398/45 |
| 2009/0052894 A1 | 2/2009 | Murata |

OTHER PUBLICATIONS

Japanese Office Action, Japanese Patent Application No. 2009-502179, dated Nov. 1, 2011, 3 pages.

* cited by examiner

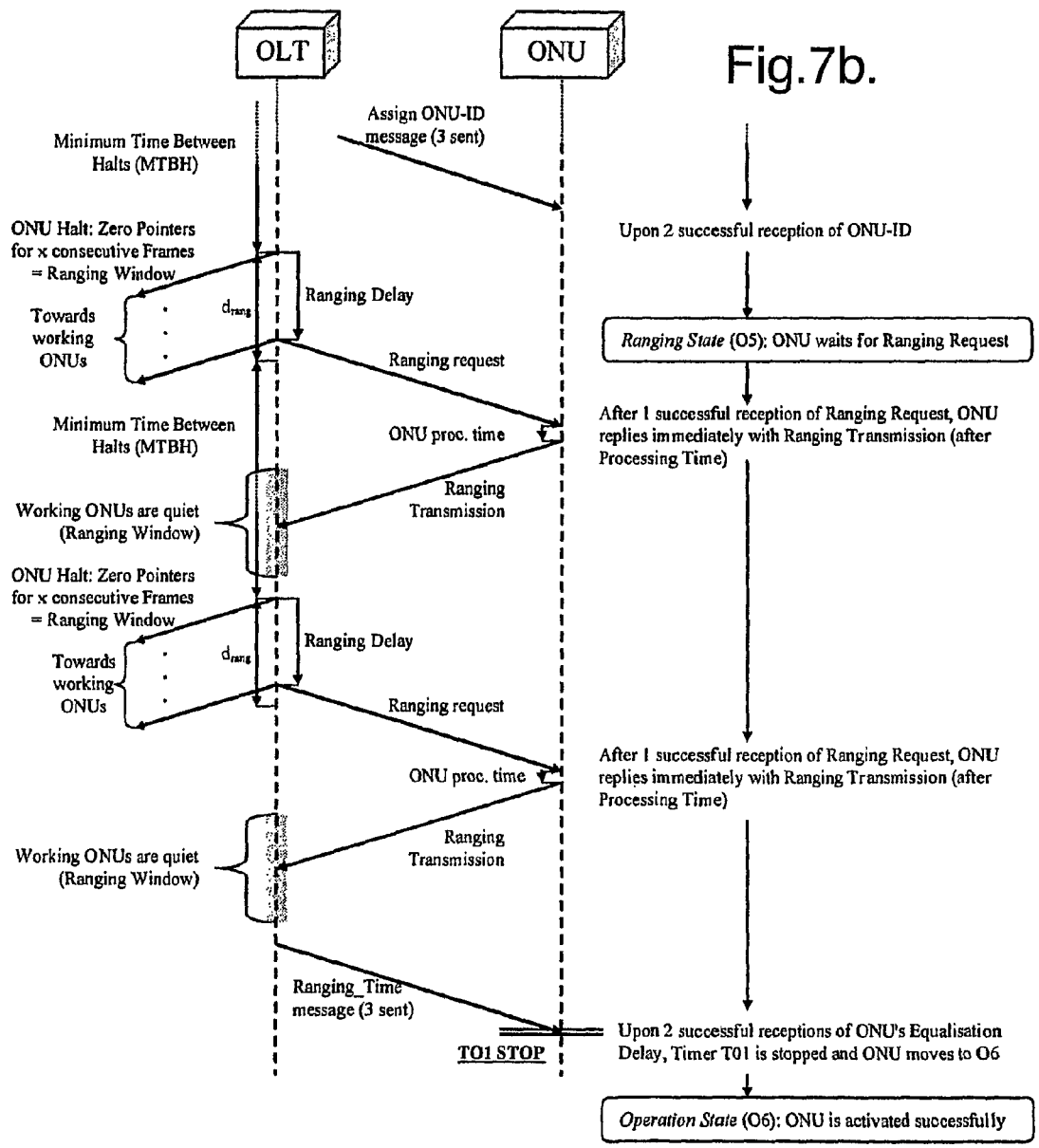

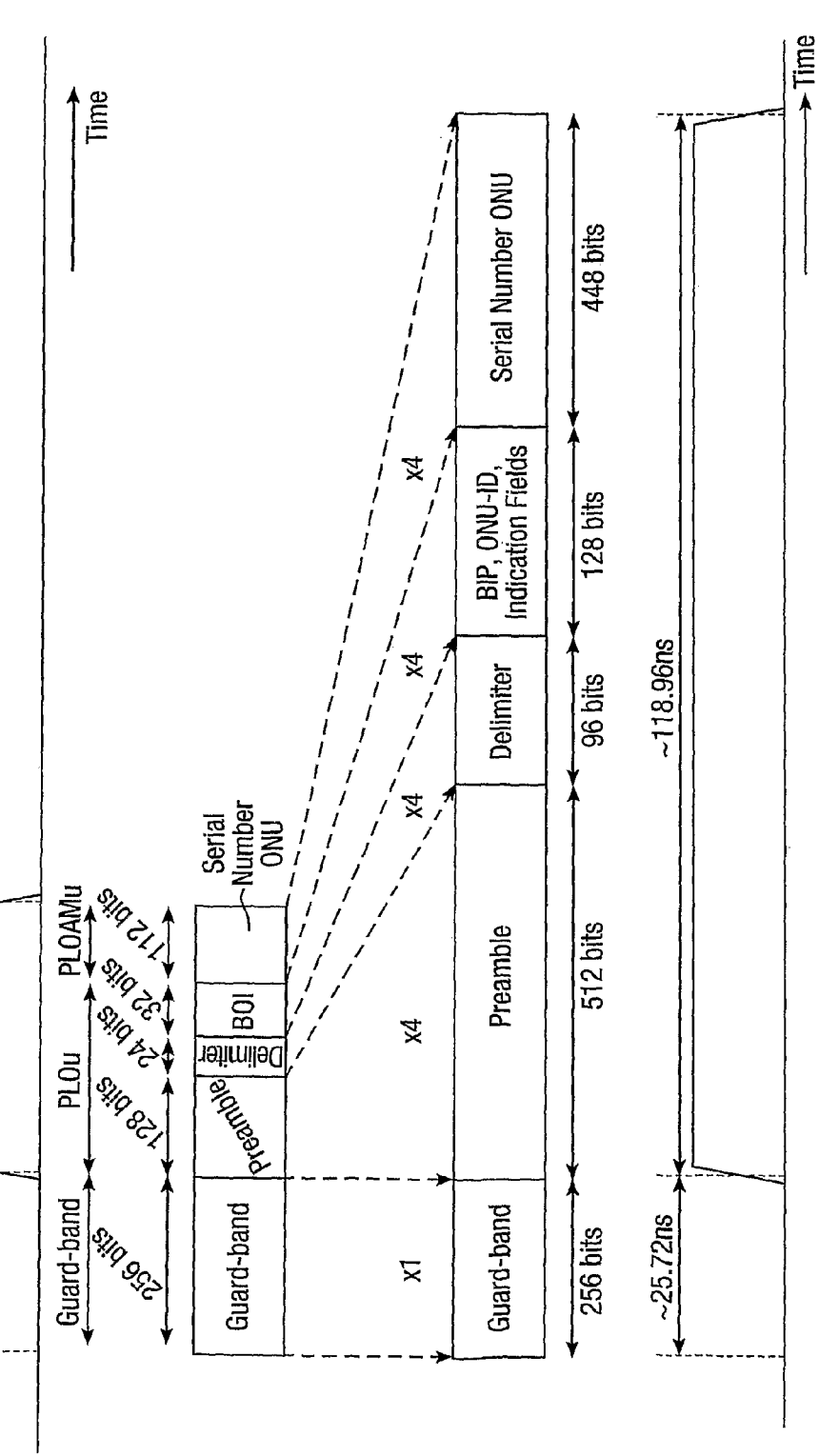

METHOD OF INTRODUCING AN OUTSTATION INTO AN OPTICAL NETWORK AND OUTSTATION THEREFOR

This application is the U.S. national phase of International Application No. PCT/GB2007/000788 filed 7 Mar. 2007 which designated the U.S. and claims priority to EP 06251853.5 filed 31 Mar. 2006, the entire contents of each of which are hereby incorporated by reference.

The present invention relates to the operation of an optical network, in particular to the introduction of an outstation into an optical network, the optical network having a central station and a plurality of outstations.

In order for a new outstation to be activated, the new outstation can transmit set-up data to the central station end. However, until the new outstation is synchronised to the network, the already-activated outstations are normally required to refrain from transmitting data to the head end, because the data could otherwise overlap and interfere with the set-up data from the new outstation. This can lead to undesirable downtime in the optical network.

According to one aspect of the present invention, there is provided a method of introducing an outstation into an optical network, the optical network having a central station, and a plurality of previously introduced outstations which are optically connected to the central station, the network being operable in: a normal operating state in which data traffic is received from previously introduced outstations at a normal data rate; and, a set-up state in which the transmission of data traffic from the previously introduced outstations is restricted relative to the normal state, the method including the step of: when the network is in the set-up state, performing a set-up operation for introducing the outstation into the optical network, the set-up operation involving the transmission of set-up data from the outstation that is being introduced, wherein the set-up data is transmitted at a reduced rate relative to the normal rate.

At least one further aspects of the invention is provided in the claims. The present invention will now be described in further details below, by way of example, with reference to the following drawing in which:

FIG. 1 shows an optical network which operates according to the present invention;

FIGS. 2a and 2b respectively show a central station and an outstation from the network of FIG. 1;

FIG. 4 shows a sampling stage for use in the central station of FIG. 2a;

FIG. 6b is a flow chart giving details of the events in FIG. 6a;

Figure 6A:
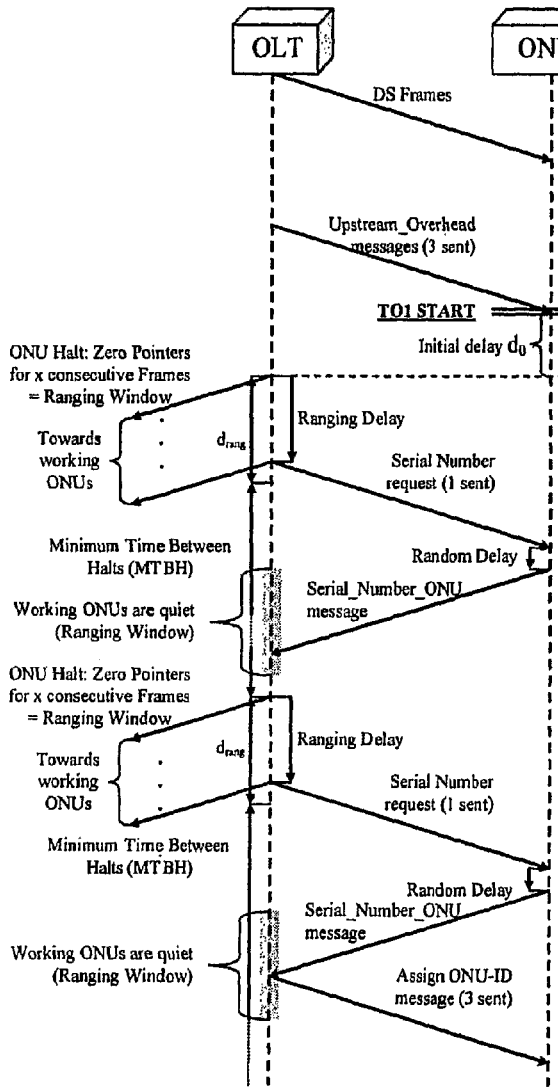
FIG. 6a is a diagram showing a sequence of events that take place when a new outstation is introduced into the network.
Figure 6B:
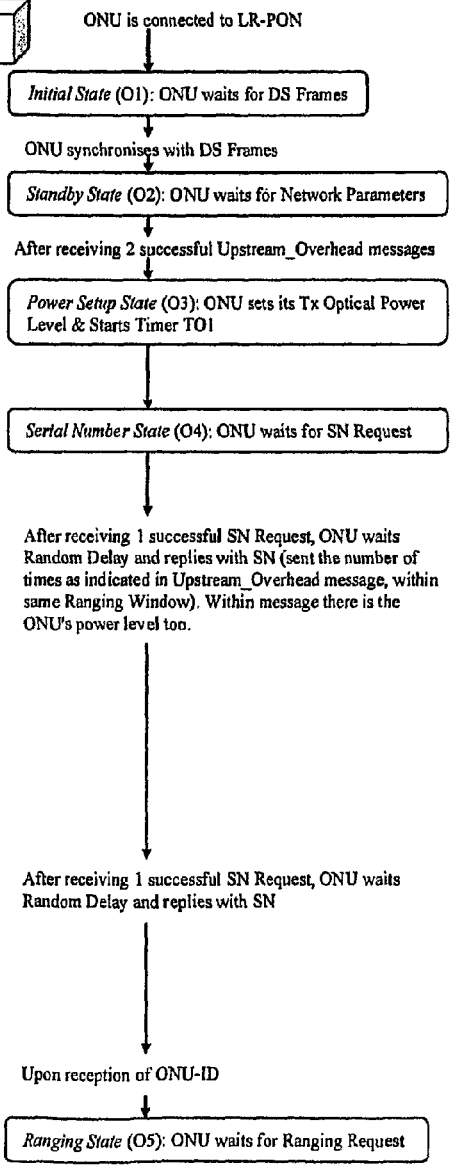

FIGS. 7a and 7b respectively continue FIGS. 6a and 6b;

FIG. 8a shows an outstation burst transmission at a normal rate; and,

FIG. 8b shows the burst transmission of FIG. 8a but at a reduced rate.

Figure 1:
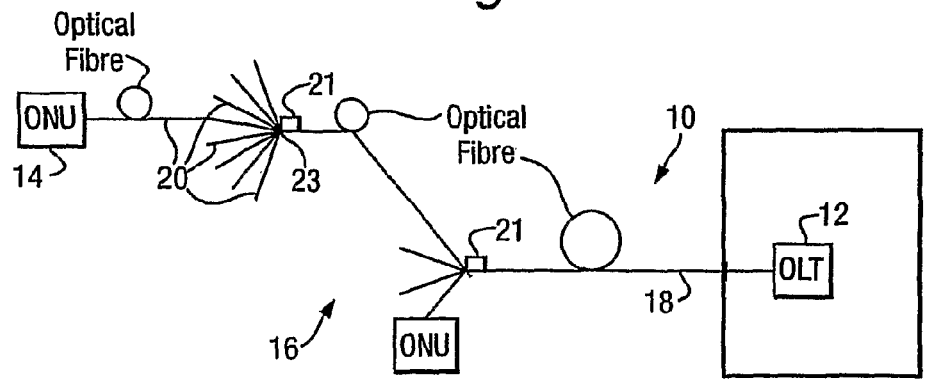

FIG. 1 shows an optical network 10, also known as a Passive Optical Network (PON), in which the central station 12, (referred to herein as an Optical Line Termination or OLT) is connected to a plurality of outstations 14 (referred to as an Optical Network Units or ONUs) by an optical fibre network 16 which carries infra red radiation. The optical fibre network 16 includes a trunk fibre 18 to which are connected a plurality of branch fibres 20 at a junction 21 formed by a coupler or splitter. A branch fibre 20 may have respective outstation 14 directly connected thereto. Alternatively, some or all of the branch fibres may each be connected to a further coupler 21, for connecting to a plurality of further branch fibres.

Light travelling in the downstream direction, that is, away from the central station 12, is distributed evenly amongst the branch fibres at each splitter. As a result, signals from the central station are broadcast to all the outstations. In the upstream direction, that is, towards the up central station, light from the branch fibres feeding into a splitter junction will effectively be combined. It is therefore important, at least for normal operation, that the signals from the outstations are synchronised relative to one another, so that when carrying traffic, signals from one outstation do not overlap with signals from another outstation. The timing of the signals from the outstations is controlled by the central station, which transmits instructions to the outstations governing the time at which each of the outstations is permitted to transmit data.

In order for normal operation to take place, the optical network can operate in a set-up phase, in which set-up data is transmitted to (and from) an outstation. A set-up phase will take place when the network is first installed. In addition, normal operation will be interrupted and a set-up phase will take place when a newly installed outstation is to be activated so as to carry traffic data in the network, or when a fault with predetermined characteristics is detected in the network.

As part of the set-up phase, the central station is configured to assign an identifier to each newly installed outstation. The identifier is assigned in response to a serial number message received from an outstation, the serial number message containing a serial number associated with that outstation (normally the serial number of an outstation will be permanently associated with that outstation when the outstation is manufactured).

The identifier assigned to an outstation can then be used to address that outstation in order to perform further set-up operations. In particular, the identifier can be used when performing a ranging operation in which the transit time or round trip time (RTD) for signals to travel to and from an outstation is measured. To perform a ranging operation, the central station instructs a selected outstation to return a signal after receiving an instruction (either immediately, or after a specified amount of time from the receipt of the instruction). From the elapsed time between the transmission of the instruction and the arrival of the return signal, the central station can calculate the round trip time to and from that outstation. Since this round trip time is likely to be different for different outstations, it is taken into account when the traffic from the different outstations is synchronised. Once the round trip time from each outstation is known, the central station can pass into an operating phase in which the central station receives traffic data from the outstations.

However, chromatic dispersion and other distorting effects take place as signals travel along the optical fibre path between the central station and the outstations. As a result, when an outstation is far from the central station, the set-up signals from that outstation can be corrupted to the extent that these cannot correctly be read at the central station. As a result, the time during which the set-up phase is taking place can become excessively long. This is particularly likely to be the case on a long reach network where the distance between an outstation and the central station can be several tens of kilometers, for example at least 10 km, or at least 80 km or even over 100 km.

The central station can be configured to request that a non-readable message is sent again. However, this increases the amount of time required for the start up phase, which is undesirable because in the start up phase, the previously installed outstations are not able to transmit useful traffic normally.

To reduce the risk that set-up data from the outstations will be non-readable at the central station, each outstation is configured to transmit at least initial set-up data at a reduced rate relative to the rate at which data is transmitted in the operating state. In particular, an outstation which has not yet received an identifier from the central station is configured to transmit its serial number to the central station at a reduced data rate. Once an outstation has received an allocated identifier from the central station, the outstation can be addressed by the central station in order to perform subsequent set-up operations, either with the outstation transmitting data at the reduced rate or at the normal rate. Once sufficient set-up operations have been completed at the reduced rate, the outstation can be instructed to transmit at the normal rate. For example, once an outstation can be addressed, a ranging operation can be performed in respect of that outstation at the normal rate. Prior or subsequently to the ranging operation being performed, an addressable outstation can be instructed to transmit a training sequence for use with an adaptable dispersion compensation device or algorithm operating at the central station.

Figure 2A:
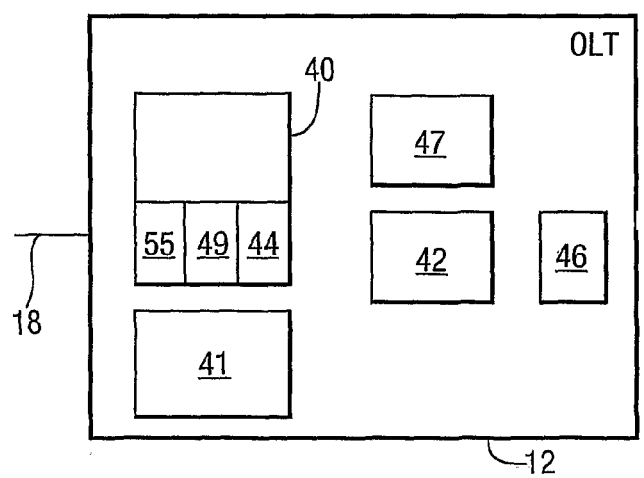

With reference to FIG. 2a, the central station 12 has an input stage 40 for receiving data from the outstations over the trunk fibre 18; a network output stage 41 for transmitting data to the outstations over the trunk fibre 18 (or another waveguide for transport in the downstream direction); a central controller 42 connected to the input stage 40 and the output stage 41, for controlling the times at which each outstation transmits data; and, a back output stage 46 for the output of data traffic from the outstations to a recipient (not shown). A clock unit 47 is also provided for controlling the timing of the communication network, the clock providing a central clock signal at a central bit rate of 10 GHz in this example. The input stage 40 includes: photo diode 55 for converting received optical signals into electrical signals; a compensation module such as an Electronic Dispersion Compensator or EDC 44; and, a sampling circuit 49 for retrieving received data. The central controller 42, the sampling circuit 49, and the compensation module 44 are implemented in a processor facility having at least one processor and at least one memory for manipulating and storing data. In this example the EDC is analogue and hence is placed before a sampling/detection circuit. Alternatively it is possible to caay out sampling/detecting first and then to perform digital compensation using Viterby algorithms.

The compensation module 44 is configured to run a compensation function for treating or otherwise equalising data received at the central station, so as to correct the data for any inter symbol interference (ISI) along the optical path between an outstation and the central station. Typically, the compensation function will have a plurality of adjustable characteristics, each of which is representative of an aspect of the way in which the compensation algorithm treats data. The adjustable characteristics are governed by a set of coefficients, such that each coefficient is associated with a respective characteristic. The choice or values for the algorithm will depend on the degree of distortion, and the nature of the distortion. Since the distortion will be different for different outstations, the compensating algorithm will operate in a training mode when receiving initial data from an outstation, (preferably when receiving a training sequence of data from an outstation, the training mode including a training algorithm for adjusting the coefficients in dependence on the nature of the distortion in the received data. Clearly, the degree of distortion will increase with the length of fibre path.

Figure 2B:
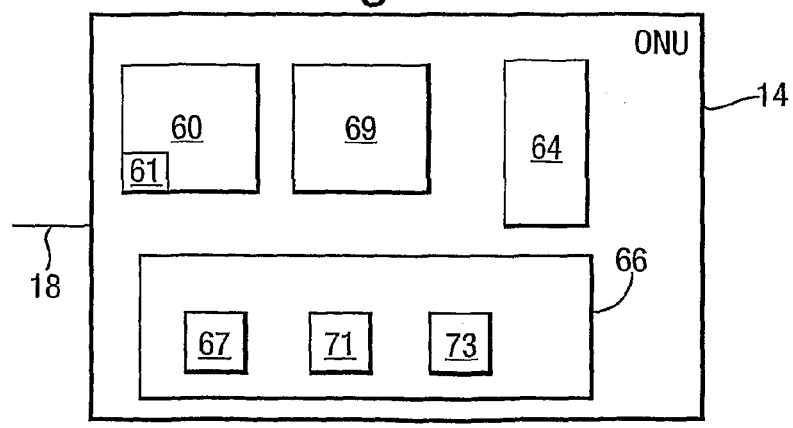

FIG. 2b shows in more detail an outstation of FIG. 1. The outstation includes: an input stage 60 for receiving optical signals from the central station 12; an interface stage for (i) receiving data traffic from a plurality of customer terminals and for multiplexing the data traffic in (preferably in the electrical domain) for transmission onto the optical network, and (ii) sending traffic carried by the optical network to the customer terminal; an output stage 66; and, a controller stage 69 for controlling the operation of the outstation. The output stage 66, which receives data from the controller stage 69 and the interface stage, includes: a laser transmitter 67 for transmitting optical signals to the central station; a laser driver unit 71 for driving the laser transmitter 67; and, a logic circuit 73 for processing data from the controller stage and/or the interface stage, the logic circuit being connected to the driver unit 71 such that the processed data can be transmitted by the laser transmitter. The outstation includes a processor facility in which software for the operation of the outstation can be stored and executed, the processor facility having at least one processor and at least one memory for manipulating and storing data.

The outstation receives data, preferably scrambled, from the central station at a central bit rate (determined by the clock unit 47 of the central station, here 10 GHz). A clock and data recovery circuit (CDR) 61 is provided at the input stage 60, the clock and data recovery circuit being configured to use the scrambled data from the central station so as to derive a local clock signal for use by the controller stage 69 of the outstation (the local clock signal being at the central station bit rate of 10 GHz). The logic circuit 73 is connected to the CDR 61 in order to receive the local clock signal therefrom, the logic circuit being configured operation to process data at a data rate governed by the local clock signal. In normal operation, this results in data from the logic circuit 73 being output at a bit rate equal to the rate of the local clock signal; that is, the output data will be digital data with transitions occurring at a rate of 10 GHz in this example (although there may be no transitions between some successive bits, there will normally be sufficient transitions in the data to indicate a 10 GHz bit rate).

To transmit data at the reduced rate, a pulse lengthening technique is employed in which each bit in a bit sequence received from the controller stage (or the interface stage if necessary) is repeated a predetermined number of times, here four times. By repeating each bit four times, the apparent bit rate from the logic circuit is reduced by a factor of four. The signal at the laser driver (and the output optical signal from the laser transmitter) will be formed by a sequence of pulses and spaces between the pulses, each of which is four times wider than the would be the case at the normal data rate. That is, the signal output from the laser is a signal with the same information content but with a reduced bit rate, here 2.5 GHz since the central station bit rate is 10 GHz. As a result, the likelihood of dispersion (that is, pulse widening) causing an error in the detection of a bit at the central station is reduced, and the Bit Error Rate (BER) will also be reduced.

Figure 3A:
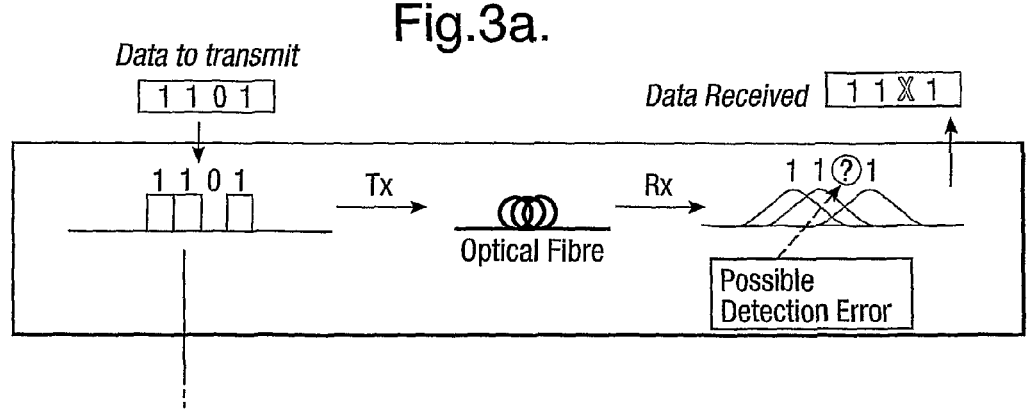
FIGS. 3a and 3b show how data can be distorted.
Figure 3B:
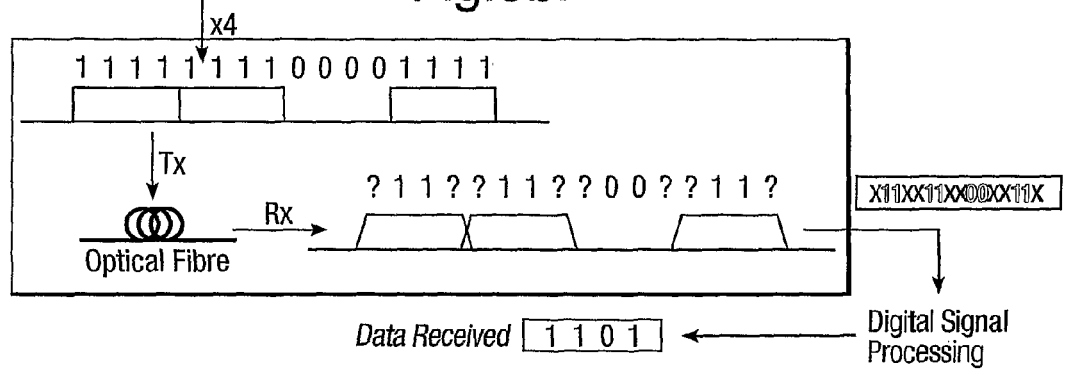

This is illustrated in FIGS. 3a and 3b. FIG. 3a shows how a data sequence 1101 will result in a sequence of pulses at the normal bit rate before transmission (left hand side) and after transmission (right hand side) over an optical fibre. The pulse spread give rise to a possible ambiguity where the "0" bit occurs. FIG. 3b shows the same data sequence but transmitted according to the pulse lengthening technique (the pulse widths in the pulses of FIGS. 3a and 3b before transmission are to scale relative to one another). In FIG. 3b the logic circuit has generated a new data sequence in which each bit of the original sequence is transmitted four times. The resulting pulse sequence from the laser then appears the same as the original data sequence but at a divided rate. After transmission over the optical fibre, the spreading (although still present) is less likely to cause an error, since it is a smaller fraction of the pulse width before the spreading.

However, the central station will normally have a burst mode receiver (not shown) for receiving signals at the normal 10 GHz rate. The receiver will be connected to the 10 GHz clock unit 47 for sampling the signals at this rate. However, a receiver configured to receive a signal at the normal 10 GHz rate will over sample the reduced rate 2.5 GHz signal (by a factor of four). Furthermore, the sampling points may not be correctly positioned in (that is, phase aligned with) the incoming pulses, because the 2.5 Gbit/s preamble sequence normally transmitted by an outstation may not have enough transitions, or at least at a suitable rate.

Therefore there may be errors on the samples near the edges of the pulses. The uncertainty in the detection of these samples at the edge of the pulses is shown with an 'X' in the detected bit sequence in FIG. 3. However, because of the introduced redundancy (due to the pulse over-sampling) and with some digital signal processing it is possible to correctly detect the transmission. The digital signal processing steps include: identifying the detected bits in the over sample sequence corresponding to the centre region of the over-sampled pulses (shown as '1s' and '0s' between the "Xs" in the detected bit sequence of FIG. 3); and, extracting one of them to obtain the phase for the final correct bit sequence.

As can be seen from FIG. 3b, the signals transmitted at the low data rate modulated on a carrier that has a uniform or constant amplitude (allowing for noise), rather than being superposed on an existing traffic stream.

Figure 4:
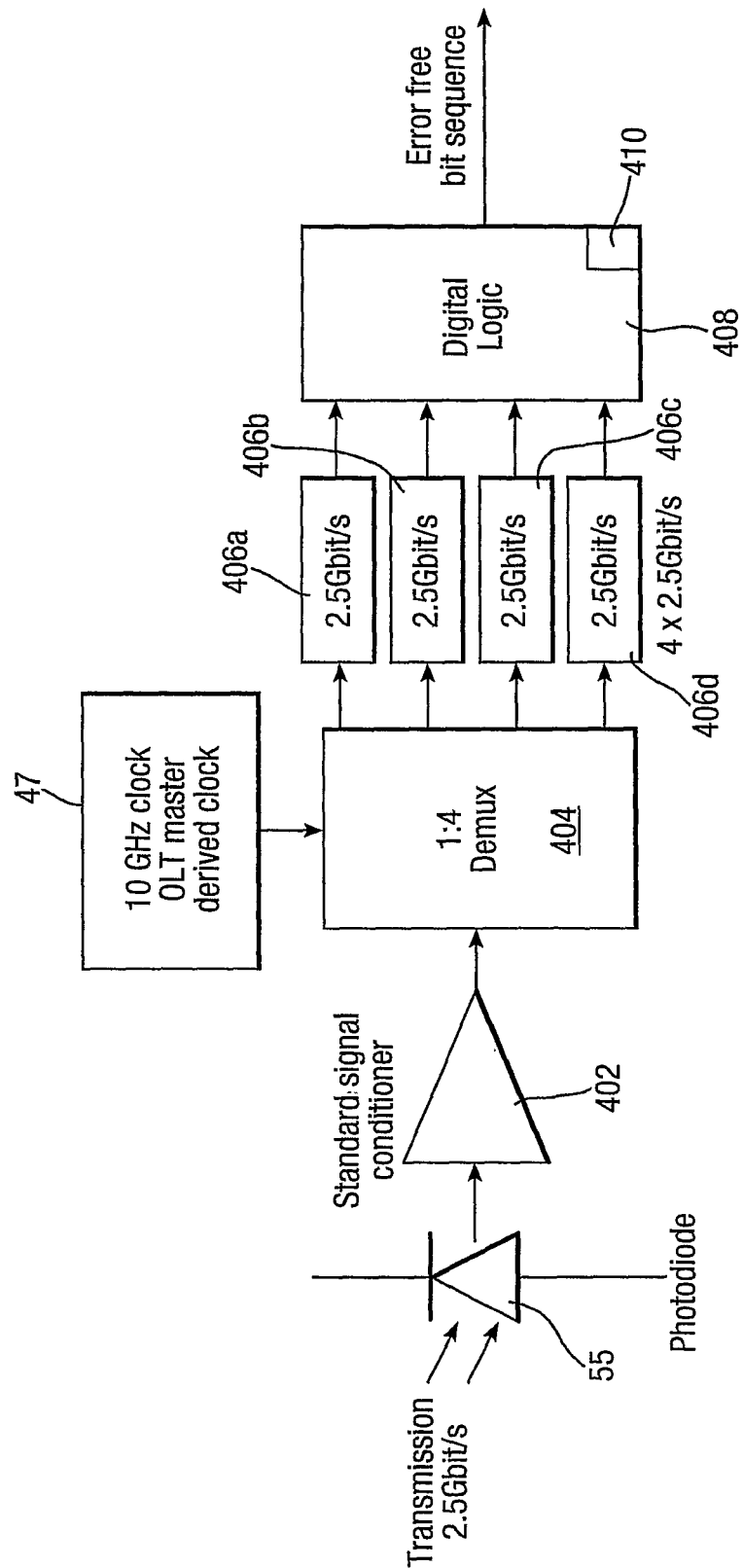

The sampling circuit 49 of FIG. 2a is shown (connected to the photodiode received 55) in more detail in FIG. 4. The circuit includes a conditioner unit 402 for processing incoming data in a known way, an output of which is connected to a sampling stage 404 for sampling signals transmitted at the lower bit rate (a conventional sampling unit not shown is also connected to the conditioner unit for sampling signals transmitted at the normal rate). The sampling stage is a 1:4 time division demultiplexer, connected to the clock unit 47 so as to operate at the central bit rate of 10 GHz. The demultiplexer servers to sample the data at 10 GHz, allocating in a cyclic fashion each successive sampled bit to a successive one of four low data rate channels 406a-406d, thereby providing four 2.5 GHz data sequences. This can be seen more clearly in FIG. 5, which shows a typical incoming signal, the sampling points labelled a-d corresponding to channels 406a-406d respectively. As can be seen from the FIG. 5, each channel is formed by data sampled are regular intervals but relative to a different phase shift point along the four bit cycle.

Figure 5:
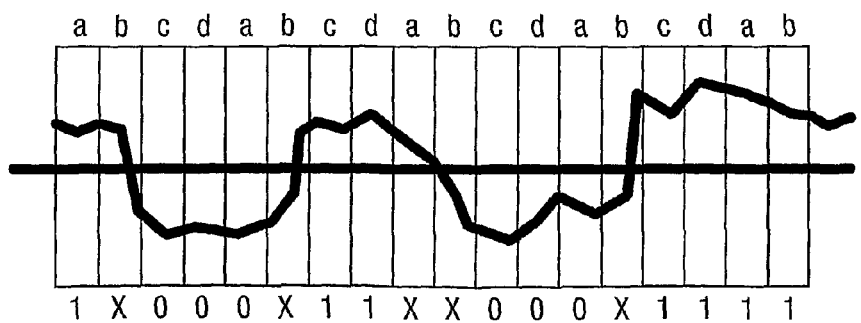
FIG. 5 shows how data can be sampled.

In the absence of any sampling error (typically due to pulse broadening and ambiguities near a pulse edge which may occur at the positions marked X in FIG. 5) the four data sequences would be the same, but displaced relative to one another by a single bit. It is therefore possible, by analysing these data sequences, to obtain the correct sample phase for the reduced rate data. Here, the low data rate channels 406a-d are fed to a digital logic stage 408. The logic stage 408 has a memory location 410 in which there is stored predetermined data. The outstations each themselves store this predetermined data (for example, it is introduced at the manufacturing stage, in a similar manner to the serial number) and are configured to transmit the predetermined information to the central station. In response to the predetermined data being received (at the reduced bit rate), the logic stage 408 is configured to compare the data from each low data rate channel 406 with the predetermined information. The low data rate channel that provides the best match, that is, the smallest error, is presumed to be sampled relative to the most appropriate phase shift point (out of the four phase shift points of the four channels). The phase shift point of this channel can then be used as the phase shift for reduced rate data subsequently arriving from the same outstation, since the subsequent data is likely to be in phase with the predetermined information, in particular if there has not been an intervening transmissions from another outstation received at the central station.

To communicate with the outstations, the central station transmits broadcast messages in the form of downstream frames. The downstream frames each contain a plurality of payload data-frames and Operation, Administration and Maintenance (OAM) information carried in different formats within the downstream frames. OAM downstream information is used by the central station, among other things, to permit a selected outstation to transmit data (or equivalently to "grant" bandwidth). The OAM information is also used for ranging, error control, security and other functions relating to the operation of the optical network. In this way, the data carried by the optical network includes data traffic, and set-up or other signalling traffic for allowing or facilitating the transport of the data traffic.

Because the downstream frames are received by all the outstations, information, instructions or other message intended for a given outstation will include an identifier, which identifier the outstation will have previously associated with that outstation (this is carried out in an activation phase explained in more detail further below). If a message is not intended for a particular outstation, the message need not include an identifier.

In the upstream direction, different outstations successively transmit data in one or more respective time slots, the position of the time slots being defined relative to the central clock signal provided by the central clock unit 47 (the actual transmission from a given outstation will take place according to the local clock signal, which may in practice be subject to small drift errors relative to the central clock signal). In this way, data from different outstations in the normal state is passively interleaved or equivalently time division multiplexed into a frame structure at an optical junction 21. Data traffic received from customer terminals at the interface stage of an outstation can then be carried over the network to the central station, where the data traffic can be output over the back output stage thereof in order to reach a possibly remote recipient.

Hereinafter an outstation will be referred to as an ONU and the central station will be referred to as an OLT.

The ONU can exist in a number of operational modes or States listed in Table 1 and described below.

a) Initial-State (O1): when the ONU's transmitter powers up. Once downstream traffic is received, the ONU can get bit and frame synchronisation.

b) Standby-State (O2): ONU waits for global network parameters such as pre-assigned equalisation delay, number of preamble bytes to use in upstream direction, etc.
c) Power-Setup-state (O3): ONU adjusts its Tx power level.
d) Serial-Number-State (O4): upon reception of request from the OLT, the ONU registers. Then the OLT assigns an ONU-ID (ONU identifier).
e) Ranging-State (O5): based on the Round-Trip-Delay (RTD) time, the OLT calculates the ONU's Equalisation-Delay.
f) Operation-State (O6): once the network is ranged, the upstream frames will be synchronised together between the ONUs and the upstream transmissions will arrive separately, each one in its correct location within the frame. Whilst in this state the ONU can be halted by the OLT, in order to implement Serial Number or Ranging processes with other ONUs.
g) POPUP-State (O7): the ONU enters this state from the Operation State O6 following a detection of some alarms. While in this state, the ONU stops upstream transmission.
h) Emergency-Stop-State (O8): in this state the ONU shuts its laser and can get to it from any other state. After the ONU is enabled again.

TABLE 1

| ONU States | | |
|---|---|---|
| O1 | INITIAL State | ONU is switched on |
| O2 | STANDBY State | ONU waits for network parameters |
| O3 | POWER SETUP State | ONU adjusts Tx optical power level |
| O4 | SERIAL NUMBER State | OLT learns ONU existence; ONU Serial Number is sent to OLT; ONU ID is assigned to the ONU. |
| O5 | RANGING State | ONU is being ranged whilst other ONUs are halted (O6a) |
| O6 | OPERATION State | ONU is transmitting data upstream |
| O6a | HALT State (sub-state) | ONU stops transmitting data upstream |
| O7 | POPUP State | ONU is in temporary LOS/LOF state |
| O8 | EMERGENCY-STOP State | ONU stops transmitting data Upstream until 'enable message' is received |

The OLT also exists in different operational modes or States, operating in the "Common part" and in the "Individual-ONU-dealing-part(n)". The common part can be viewed as software modules operating within the central controller 42 of the OLT, the software module including a set of instructions which relate to the optical network as a whole. The individual part can be viewed as a module, also referred to as an individual state machine, which includes instructions relating to the control of a given ONU. The OLT has as many OLT individual state machines as ONUs it is controlling. The states are presented in Table 3.

The OLT main function in the "Common part" is to register/discover ONUs. The OLT's main function in the individual part is to measure the RTD, grant bandwidth to the ONU, and deal with ONU issued alarms LOS, LOW, and LOF The states of the OLT in the "Common part" and in the "Individual Part" are summarised in Tables 2 and 3 respectively.

TABLE 2

| OLT states in the common part | | |
|---|---|---|
| OLT-COM1 | SN_STANDBY State | Serial number acquisition standby: OLT waits for periodic cycle time-out or indication for 'new' or 'missing' ONU |
| OLT-COM2 | SN_ACQUISITION State | Serial number acquisition: OLT checks for 'new' or 'missing' ONUs, and assigns an ONU ID to the discovered ONUs |
| OLT-COM3 | RTD_STANDBY State | RTD measurement standby: whilst OLT common part is in this state, OLT individual parts start RTD measurement cycle over discovered ONUs. As long as RTD measurement cycles are applied, the OLT cannot check for 'new' or 'missing' ONUs |

TABLE 3

| | | OLT states in the individual part |
|---|---|---|
| OLT-IDV1 | INITIAL State | The OLT is waiting for the RTD measurement start order, i.e. ONU(n) is in O1, O2, or O4 state. |
| OLT-IDV2 | RTD State | The OLT is in RTD measurements cycle |
| OLT-IDV3 | OPERATING State | Whilst the ONU(n) is in operation state (O6) |
| OLT-IDV4 | POPUP State | Whilst the ONU(n) is in POPUP state (O7) |

FIG. 6a and FIG. 7a, which follows on from FIG. 6a, are diagrams outlining the sequence of events that occur when activating an ONU in a working long reach PON or LR-PON, that is, when an ONU is newly required to operate in a network during a period in which the OLT is controlling a number of ONU with connections established between them. In each of these figures, the vertical axis represents time, which increases in the downward direction. The horizontal direction reflects a topological distance, the position of the OLT and a the new ONU each being indicated by a dashed horizontal line. The corresponding steps are detailed in the flow charts of FIGS. 6b and 7b respectively.

When a new ONU is connected to a LR-PON the following processes take place: the new ONU listens to the Downstream transmissions; the ONU synchronises with Downstream frames; the ONU gets the system parameters and other information from the PLOAMd "Upstream_Overhead" message that the OLT broadcasts to all ONUs; the ONU sets its transmitter power level; and, the ONU enters the Serial Number State O4 (see Table 1) where it will wait for an opportunity to register to the OLT.

During the steps above, the OLT controls the access of the working ONUs to the LR-PON bandwidth as usual. Then, at a pre-determined time that can be cyclic e.g. once every day, or once every hour, or optionally prompted from the operating system of the OLT, the common part of the OLT state machine moves from OLT-COM1 to OLT-COM2 (see Table 2) where it starts a Serial Number (SN) Registration Cycle, in which the OLT starts a Ranging Window and sends Serial Number Requests (see FIG. 6). In order to start the Ranging Window, the OLT broadcasts a message intended for all the already registered ONUs (the working ONUs) which does not permit the registered ONUs to transmit for a specified number "x" of consecutive frames (the ONU Halt message). After a ranging delay, a first Serial Number Requests is transmitted.

The ONUs in State O4, upon successful reception of a Serial Number Request, apply a random delay and send to the OLT an Serial_Number_ONU message or equivalently a "Registration Transmission" message which includes the serial number of the ONU transmitting the message (the random delay is applied so that if more than one ONU responds to the serial number request, it is less likely that the responses will interfere with each other). The Registration Transmission message is transmitted at a bit rate that is four (4) times lower than the central bit rate of the PON. This is illustrated in FIGS. 8a and 8b, which respectively show a Registration Transmission message at the normal bit rate and at the reduced bit rate. The message is formed by a cell having, in the following order to arrive at the OLT: a guard band to allow for timing inaccuracies relative to the timing of other ONUs; a preamble, which at the normal rate, the OLT can use to acquire the correct phase alignment for sampling the data; a delimiter portion; a portion with indication fields; and, a field containing the serial number of the ONU. The guard band is not lengthened, but each of the other fields is transmitted at the reduced rate of 2.5 GHz as opposed to the normal rate of 10 GHz, with the result that each of those fields has a duration which is increased by a factor of four. As indicated in the inset, each bit of the data in the lengthened fields, in particular the serial number field, is transmitted four times instead of one.

Because of the difficulty acquiring phase alignment with the data arriving at the reduced rate, data which follows a known and fixed pattern in the delimiter field and the preamble is used to affect phase alignment as outlined above.

The ranging delay indicated in FIG. 6a (that is, the delay between the transmission of the ONU Halt message and serial number request) is chosen in dependence of the round trip time to the furthest ONU such that a response to the serial number request will arrive at the OLT in a time interval when, as a result of the ONU halt message, traffic from an already registered ONU will not be arriving at the OLT. This time interval or quiet period, during which traffic from already registered ONUs is not arriving at the OLT, is known as the Ranging Window or the Halt Window, and is shown as a shaded time region in FIGS. 6a,7a. The width of the Ranging Window (determined by the value of x) will depend on the furthest expected distance a new ONU.

Because there are potentially hundreds of ONUs wanting to register at the same time during the same Ranging Window, an ONU is configured to send only one Registration Transmission, although each ONU could in principle be configured to send more than one Registration Transmission.

Upon correct reception of the Registration Transmission 'y' times (e.g. 2 times as shown in FIG. 6a), the OLT will send to that particular ONU the downstream PLOAM message "Assign_ONU-ID" a number of times (e.g. 3 times) in which the OLT assigns an identification number to that ONU which the ONU will store in a local memory thereof in order to allow the ONU to distinguish instructions and data intended for it from instructions and data intended for other ONUs. The OLT will map the serial number of the OLT to the assigned identifier (as it has done for the already registered ONUs). In this way the OLT has identified one or more 'new' ONUs during this Registration Cycle. The ONU receiving the "Assign_ONU-ID" message moves onto the Ranging State O5.

By using a reduced rate to receive the serial number, it is possible to quickly register the ONU so that it can be addressed for further set up operations and subsequent traffic transmission. It is important to effect the set up of an ONU quickly, as during the set up period the registered ONU are prevented from transmitting-traffic (in particular during the ranging windows). Thus, the low rate may be used for various operations in the set up phase.

However, it is particularly important that the registration phase is not delayed as a result of distortion: once an ONU is registered, distortion compensation directed to that particular ONU can be carried out on the data from that ONU. Clearly, data at the reduced rate could be used for other aspects of the set up phase, but the benefits of the reduced error could be outweighed by the increased time required for the transmission of messages. The registration is thus a bottle neck which will particularly benefit from the low data rate transmission from an ONU, such that after the message containing the serial number is sent, subsequent message from an ONU will be at the normal rate.

The serial number of the OLT is normally 8 bytes long, having a vendor ID of 4 bytes and a vendor specific number also of bytes. In contrast, the assigned identifier can be shorter, for example 1 byte or 1.5 bytes (1 byte is used for GPON). However, the OLT need not transmit an assigned identifier to an ONU, and could instead simply use the received serial number to identify an ONU.

When a 'new' ONU has been registered, the OLT creates an individual state machine to control the rest of the activation of that particular ONU and settles in the initial state OLT-IDV1. Once the Registration Cycle has finished, the OLT, which is in the common part, moves to the OLT-COM3 state (see table 2), and the OLT in the individual part moves to the OLT-IDV2 state for each registered ONU (see Table 3), starting a Ranging or RTD measurement cycle.

The OLT then sends a Ranging Request (see FIG. 7) to a particular ONU(n), n being any 'new' ONU just being registered. The ONU receiving the Ranging Request, if it is in Ranging State O5, sends the Ranging Transmission Upstream consisting of the PLOu and the PLOAMu message "Serial_Number_ONU". When the OLT receives the Ranging Transmission from the ONU(n) successfully 'y' times (e.g. twice as shown in FIG. 7) computes the necessary EqD (equalisation delay, that is, an offset stored at an ONU which takes into account the different round trip times for the different ONUs).

The OLT sends the PLOAMd message "Ranging_time" 3 times (see FIG. 7), in which the OLT tells the ONU(n) what EqD has to apply to all transmissions henceforth, and moves onto the OLT-IDV3 State (see Table 3).

Depending on the distances of the ONUs, it may be necessary to perform a further process in order to acquire the necessary set of parameters for the EDC. Another possibility is to start giving service traffic grants whilst refining the calculation of the optimum parameters for the EDC.

As can be seen from the above, the outstation is operable in first mode in which data is trans at norm rate, and in a second mode in which data is transmitted at the reduced rate, thus conveniently allowing the down time during set-up to be kept reasonably small.

Additional comments are provided as follows:

The reduced rate of 2.5 Gbit/s is only an example. In practice the rate could be reduced by another sensible factor. The specific factor will be chosen by considering at least the necessary rate at which degradations are small enough to allow correct detection by the OLT. Thus, considerations governing the choice of reduction factor may include the length of the fibre between the OLT and an ONU. However, a reduction factor greater than 50, in particular greater than 100, is not envisaged.

The OLT, upon the first transmission from a 'new' ONU, has not the right parameters for the EDC to compensate for the likely degradation that the ONU's signal will have undergone. Still it is vital that the OLT correctly receives this first ONU transmission (see below paragraph about 'ranging efficiency') when the ONU's operational bit rate is 10 Gbit/s. This embodiment above helps achieve the correct detection of this very first transmission. The ONU first transmission occurs during its registration, when the ONU is in the Serial Number state (O4) and the OLT in the Serial Number Acquisition State (OLT-COM2). The reduced bit rate transmission can be applied in all transmissions during which the ONU is in the O4 state and the OLT is in the OLT-COM2 state (in the example of FIG. 6 there are 2 transmissions whilst the ONU is in the O4 state). This is to ensure that the OLT identifies the new ONU as soon as possible.

The ranging efficiency $E_{rang}$ of the LR-PON can be defined as:

$$E_{rang} = \frac{MTBH}{(d_{rang} + MTBH)},$$

where $d_{rang}$ is the duration of the Ranging Window and MTBH is the time between Ranging Windows.

It is important to keep this efficiency high because the operational ONUs cannot send service traffic upstream during these windows. The lower the efficiency the higher is the average delay and hence the effective bandwidth decreases. Therefore it is vital to keep the launching of these Ranging Windows to a minimum possible and their duration to the shortest possible. Another aspect is that it is interesting to keep the total activation time of an ONU as short as possible, which increases the perceived quality of service in a PON system.

To help achieve these goals it is desirable that the OLT can identify a 'new' ONU and measure its RTD quicily. Once this is done, the OLT can instruct the 'new' ONU its EqD (which takes into account the different distances of different ONUs from the central station) and start assigning transmission grants to this ONU within a frame along with other live traffic from other 'working' ONUs, to e.g. fine-tune the detection parameters (for instance the parameter set for the receiver's EDC) of each ONU using other techniques using the EDC without unduly losing PON ranging efficiency. For example the OLT may decide it needs a longer sequence from that ONU in order to, calculate the parameters for the EDC. Because it has already been ranged, the OLT can assign say 1200 bytes to the ONU (i.e. 1 microsecond of transmission). If necessary, the OLT can leave the following byte or two unassigned so any pulse widening wouldn't affect the following transmission. For this to work it is helpful that the RTD measurement at 2.5 Gbit/s is accurate enough to fit within the space allocated within the frame between any other ONUs' transmissions. The guard-band at the beginning of all ONU transmissions can accommodate this inaccuracy if it is sufficiently small.

The invention claimed is:

1. A method of introducing an outstation into an optical network, the optical network having a central station, and a plurality of previously introduced outstations which are optically connected to the central station, the network being operable in: a normal operating state in which data traffic is received from previously introduced outstations at a normal data rate; and, a set-up state in which the transmission of data traffic from the previously introduced outstations is restricted relative to the normal state, the method including:
   when the network is in the set-up state, performing a set-up operation for introducing the outstation into the optical network, the set-up operation involving the transmission of set-up data from the outstation that is being introduced, wherein the set-up data is transmitted at a reduced rate relative to the normal rate.

2. A method as claimed in claim 1, wherein the reduced rate is lower than the normal operating rate by a factor that is an integer number.

3. A method as claimed in claim 1, wherein the set-up data includes identifier information.

4. A method as claimed in claim 1, wherein the set-up operation is a registration operation in which an identifier is associated with the he outstation being introduced.

5. A method as claimed in claim 4, wherein a ranging operation is performed subsequently to the registration operation, in which operation data transmitted at the normal rate by the outstation being introduced.

6. A method as claimed in claim 1, wherein the optical network has at least one branch junction, and wherein signals from the previously introduced outstations interleaved at the branch junction in the normal operating state.

7. A method as claimed in claim 1, wherein the network is long reach network in which at least some of the outstations are topologically separated from central station by at least 80 km.

8. A method as claimed in claim 1, wherein data is sent at the reduced rate by repeating each bit at the normal rate a predetermined number of times.

9. A method as claimed in claim 1, wherein data received at the reduced rate is sampled at the normal rate at the central station.

10. A method as claimed in claim 1, wherein the central station is configured to control the timing of the transmissions from the previously introduced outstations.

11. A method as claimed in claim 1, wherein the transmission of data traffic from the previously introduced outstations is restricted relative to the normal state by introducing at least one quiet period during which there is substantially no traffic from the previously introduced outstations arriving at the central station.

12. An outstation for use with an optical network having a central station, the outstation having a normal operating state in which the outstation transmits data at a normal bit rate, and a set-up state in which the outstation transmits data at a reduced bit rate relative to the normal bit rate, wherein the outstation is configured to respond to a set-up message from the central station with a return messaged at the reduced rate.

13. A method of introducing an outstation into an optical network, the optical network having: a central station and a plurality of previously introduced outstations which are optically connected to the central station, wherein the network has a normal operating rate at which the previously introduced outstations transmit data to the central station, the method including the steps of: transmitting set up data from the outstation being introduced to the central station; and, using the set up data to perform at least one set-up operation for introducing the outstation into the optical network, wherein the set up data is transmitted at a reduced rate than is lower than the normal operating rate.

* * * * *